(12) United States Patent
Comin et al.

(10) Patent No.: US 12,074,639 B2
(45) Date of Patent: Aug. 27, 2024

(54) METHODS, SYSTEMS AND DEVICES FOR FREE-SPACE OPTICAL COMMUNICATIONS

(71) Applicant: AIRBUS (S.A.S.), Blagnac (FR)

(72) Inventors: Alberto Comin, Munich (DE); Thomas Multerer, Taufkirchen (DE); Andrew A. Anderson, Münchsmünster (DE); Jan Tepper, Munich (DE); Bernd Schleicher, Ebersberg (DE); Andreas Drexler, Munich (DE); Alejandro Gimeno Martín, Munich (DE); Kevin Shortt, Munich (DE)

(73) Assignee: Airbus (S.A.S.), Blagnac (FR)

( * ) Notice: Subject to any disclaimer, the term of this patent is extended or adjusted under 35 U.S.C. 154(b) by 0 days.

(21) Appl. No.: 17/835,042

(22) Filed: Jun. 8, 2022

(65) Prior Publication Data

US 2022/0393761 A1 Dec. 8, 2022

Related U.S. Application Data

(63) Continuation of application No. PCT/EP2020/085327, filed on Dec. 9, 2020.

(30) Foreign Application Priority Data

Dec. 13, 2019 (EP) .................. 19216073.7

(51) Int. Cl.
*H04B 10/11* (2013.01)
(52) U.S. Cl.
CPC .................. *H04B 10/11* (2013.01)

(58) Field of Classification Search
CPC ...................................... H04B 10/11
USPC .................................... 398/119
See application file for complete search history.

(56) References Cited

U.S. PATENT DOCUMENTS

| | | | |
|---|---|---|---|
| 5,359,446 A | 10/1994 | Johnson et al. | |
| 6,931,245 B2 | 8/2005 | Fikart | |
| 7,593,641 B2 | 9/2009 | Tegge et al. | |
| 7,616,897 B2* | 11/2009 | Graves | H04B 10/1121 398/119 |
| 10,003,402 B2* | 6/2018 | Boroson | H04B 10/118 |
| 10,686,523 B1* | 6/2020 | Gleason | H01Q 21/065 |
| 11,201,673 B1* | 12/2021 | Searcy | H04B 10/116 |
| 2012/0188467 A1* | 7/2012 | Escuti | G02F 1/1347 349/1 |

(Continued)

FOREIGN PATENT DOCUMENTS

| | | |
|---|---|---|
| EP | 3 262 376 A2 | 1/2018 |
| EP | 3 388 892 A1 | 10/2018 |

(Continued)

OTHER PUBLICATIONS

European Search Report for Application No. 19216073 dated Jun. 9, 2020.

(Continued)

*Primary Examiner* — Dalzid E Singh
(74) *Attorney, Agent, or Firm* — KDW Firm PLLC

(57) ABSTRACT

Methods, systems, and devices for free-space optical communications. An aircraft includes a flat optical communication terminal on an external surface of the aircraft, the flat optical communication terminal being configured to communicate with a ground station via a free-space optical communication link.

10 Claims, 4 Drawing Sheets

(56) References Cited

U.S. PATENT DOCUMENTS

| | | |
|---|---|---|
| 2014/0268328 A1 | 9/2014 | Dorschner |
| 2015/0086157 A1 | 3/2015 | Fontaine et al. |
| 2016/0291405 A1* | 10/2016 | Frisken ............. G02F 1/136277 |
| 2018/0026721 A1* | 1/2018 | Bock ...................... H04B 10/64 |
| | | 398/130 |
| 2018/0039154 A1* | 2/2018 | Hashemi ............... G02F 1/2955 |
| 2023/0110986 A1* | 4/2023 | Uyeno .................... G01S 7/288 |
| | | 398/115 |

FOREIGN PATENT DOCUMENTS

| | | |
|---|---|---|
| WO | WO 2012/044942 A2 | 4/2012 |
| WO | WO 2016/190932 A1 | 12/2016 |
| WO | WO 2017/058322 A2 | 4/2017 |
| WO | WO 2017/218511 A1 | 12/2017 |
| WO | WO 2018/094706 A1 | 5/2018 |
| WO | WO 2018/227007 A1 | 12/2018 |

OTHER PUBLICATIONS

International Search Report for Application No. PCT/EP2020/085327 dated Feb. 22, 2021.
European Office Action for Application No. 192160737 dated Jun. 21, 2023.

\* cited by examiner

METHODS, SYSTEMS AND DEVICES FOR FREE-SPACE OPTICAL COMMUNICATIONS

CROSS-REFERENCE TO RELATED APPLICATIONS

This application is a continuation of and claims priority to Patent Application No. PCT/EP2020/085327 filed Dec. 9, 2020, which claims priority to European Patent Application No. 19216073.7 filed Dec. 13, 2019, the entire disclosures of which are incorporated by reference herein.

TECHNICAL FIELD

The disclosure herein pertains to methods, systems, and devices for free-space optical communications (FSOC), particularly for use in aerospace communications and air-to-ground communication networks.

Although applicable for any kind of vehicle, the disclosure herein and the corresponding underlying problems will be explained in further detail in conjunction with an aircraft.

BACKGROUND

The incorporation of free-space optical communications (FSOC) into air-to-ground networks allows for extending ground-based backbone fiber networks to aircraft and spacecraft. As a first step, FSOC can be integrated into the European Aviation Network (EAN) providing unprecedented connectivity to all stakeholders throughout the aviation industry. The operational processes developed for this application can then be easily transferred to satellite communications for GEO and LEO architectures.

Prior approaches for air-to-ground mobile communications and network data routing include communication channels based on radio-frequency (RF) communication. The EAN already provides for air-to-ground systems based on the LTE standard, however, the bandwidth of such systems is limited. U.S. Pat. No. 5,359,446 discloses a free-space optical communications system for transmitting data between an aircraft computer system and a ground-based computer system. U.S. Pat. No. 7,593,641 discloses a system for free-space optical satellite communications with a ground station and transceiver for transmitting and receiving an optical communications signal to or from a satellite. WO 2018/094706 A1 discloses a polarization-based phased array transmitter. U.S. Pat. No. 6,931,245 B2 discloses a system for reception and downconversion of multiple polarizations in a single low noise block downconverter. US Patent No. 2015/0086157 A1 discloses spatial multiplexers based on photonic lanterns with mode selectivity.

SUMMARY

It is an object of the disclosure herein to provide technical solutions that enable high bandwidth communications of more than 40 Gbps to aircraft in flight, and eventually spacecraft in orbit.

At least some of these objects are achieved by the subject-matter disclosed herein. Advantageous embodiments are described herein. Some or all of the objects may also be achieved by other teachings incorporated into the present disclosure.

According to a first aspect of the disclosure herein, an aircraft includes a flat optical communication terminal on an external surface of the aircraft, the flat optical communication terminal being configured to communicate with a ground station via a free-space optical communication link. According to a method of the first aspect of the disclosure herein, the method includes the steps of mounting a flat optical communication terminal to an external surface of the aircraft, establishing a free-space optical communication link between the flat optical communication terminal and one or more ground stations, and exchanging data between an aircraft network and a ground-based optical fiber network via the established free-space optical communication link.

By integrating FSOC into existing communication systems for aircraft and spacecraft, their capability may be greatly enhanced so that new business models ranging from in-flight connectivity to internet services to remote regions may emerge. The first aspect of the disclosure herein enables translating optical transport network fiber communications to free-space, i.e. making the optical transport network wireless. To accomplish this task, various aspects of this disclosure concern advanced concepts of operations for the network as well as new FSOC technologies that may be integrated alongside existing RF and fiber network infrastructure. Wireless optical transport networks advantageously do not require any kind of specific terminals, be it flat or of other shape. However, flat terminals are beneficial for producing advantages in several application scenarios, such as for example communication between aircraft, satellites, and ground stations.

Free-space optical communications components can be integrated into optical transport network (OTN) architecture. This will enable seamless operations and smooth ground station handovers as key elements of the network. Processes such as traffic re-routing between stations, mitigation of weather outages, and aircraft acquisition and tracking need to be elaborated.

In order to successfully integrate optical communication in avionics, optical terminal need to be seamlessly integrated into an aircraft. Advantages of such terminals include the very low drag and the light weight. The concepts of operation for such an integrated optical terminal within the aircraft rely on two key technologies: optical phased arrays (OPAs) and photonic integrated circuits (PIs).

OPAs consist of a collection of transmitters that all together emit the same signal in waveform. These waves interfere both constructively as well as destructively, thereby amplifying the emitted signal in one direction and suppressing it in other directions. Such an array can emit a strongly focused signal that can be directed in different directions by specifically staggering the timing of the transmissions that occur at different points along the array. OPAs are based on controlling the phase of light waves transmitting or reflecting from a two-dimensional surface by adjustable surface elements and therefore provide a way to steer an optical beam without mechanically moving parts. OPAs are lightweight, flat and can be integrated with PICs.

A specific case of integrated optics are PICs—sometimes called planar lightwave circuits (PLCs)—which include several optical and electronic components integrated onto a single device. PICs may for example be manufactured using wafer-scale technology, such as lithography, on silicon substrates, silica, or non-linear crystal materials (for example lithium niobate ($LiNbO_3$)). Integrated optics based on silica-on-silicon allows leveraging of microelectronics technology. Couplers, splitters, filters, combiners or other elements with optical gain may be fabricated with silica waveguides. Such optical elements may be favorably coupled to optical fibers. Silicon photonics enable the direct implementation of photonic functions on silicon chips. Other technologies involve forming PICs with indium phosphide (InP). Lithographic fabrication with chemical processing, laser micromachining and/or seeding with dopants enable the implementation of fused silica waveguides far below the surface of the substrate. Those embedded waveguides allow for the utilization of the third dimension, i.e. three-dimensional circuit design.

Non-linear devices such as electro-optic modulators (EOMs) or acousto-optic transducers can be implemented on the basis of lithium niobate ($LiNbO_3$) as a nonlinear crystal material. $LiNbO_3$ substrates can be treated with diffusion processes of titanium to form waveguides or with doping processes to form amplifiers and lasers. $LiNbO_3$ is birefringent so that filters may be designed on $LiNbO_3$ substrates based on the control of polarization.

PICs are, in general, able to carry complex circuit configurations, while at the same time allow for reduction in size and weight of many photonic components, such as waveguides, detectors, dense wavelength division multiplexers (DWDMs), circulators, modulators and erbium doped fiber amplifiers (EDFAs).

The concepts, processes, and technologies contained in this disclosure are not only applicable for air-to-ground communications, but may also be envisioned in other applications such as air-to-air applications (e.g. aircraft meshed networks), geostationary satellite communications, or low earth orbiting constellation communications.

A second aspect of the disclosure herein relates to a communication device for a radio-frequency (RF) transmission and reception system, a transmitter device of the communication device comprising an IQ modulator having a digital-to-analog converter (DAC) for the in-phase (I) component of an RF transmission signal and a digital-to-analog converter (DAC) for the quadrature (Q) component of the RF transmission signal. The IQ modulator is coupled to a first RF upconverter module configured to upconvert the in-phase (I) component of the RF transmission signal from baseband to the RF domain and to a second RF upconverter module configured to upconvert the in quadrature (Q) component of the RF transmission signal from baseband to the RF domain. The transmitter device further comprises a local oscillator circuit configured to generate a local oscillator (LO) signal and a polarization circuit coupled downstream of the local oscillator circuit. The polarization circuit is configured to output two mutually orthogonal linearly polarized LO signals derived from the LO signal output by the local oscillator circuit and to route a first one of the two mutually orthogonal linearly polarized LO signals to first and second RF mixers of the first RF upconverter module and to route a second one of the two mutually orthogonal linearly polarized LO signals to first and second RF mixers of the second RF upconverter module. The transmitter device further comprises a first phase shifting circuit coupled between the polarization circuit and the first and second RF mixers of the first RF upconverter module and a second phase shifting circuit coupled between the polarization circuit and the first and second RF mixers of the second RF upconverter module. The first and second phase shifting circuits are configured to generate right-handed and left-handed circularly polarized LO signals by imposing a 90° phase shift on the respective ones of the two mutually orthogonal linearly polarized LO signals.

It is a particular advantage of the second aspect that the implementation of the polarizer circuit together with the local oscillator allows for an increased reuse potential when scaling to large arrays of transmission and reception antennae: The polarization processes needs only to be performed once and the polarized LO signals may be fed to every antenna element within the antenna array.

Increased flexibility for the transmission and reception system may be added by providing functionality for correction and/or calibration of the polarized LO signals. Since the polarization circuitry is only implemented once in the RF transmission and reception systems only very little chip area on an IC is needed.

Typically, local oscillator circuits use overdriven signals. Thus, the requirements for the degree of linearity of the polarizer circuits are decreased in comparison to the degree of linearity required for polarized circuits in the RF domain where bandwidth and linearity boundary conditions are much more constrained. Moreover, splitting and combining signals into polarization branches is easier to implement in baseband because of the lower operational frequency.

According to some embodiments of the second aspect, the first and second phase shifting circuits are implemented within the first and second RF upconverter module, respectively. According to some alternative embodiments of the second aspect, the first and second phase shifting circuits are implemented outside the first and second RF upconverter modules. In particular, in some embodiments, the first and second phase shifting circuits may be connected directly to the polarization circuit.

According to some embodiments of the second aspect, the first and second RF upconverter modules each include a power amplifier coupled to the output ports of the first and second RF mixers. According to some embodiments of the second aspect, the power amplifier of the first RF upconverter module is coupled to a first transmit antenna. According to some embodiments of the second aspect, the power amplifier of the second RF upconverter module is coupled to a second transmit antenna.

According to some embodiments of the second aspect, the first and second phase shifting circuits are implemented with a T-Flipflop comprising two D-Flipflops having the inverted signal output port connected to the input port.

A third aspect of the disclosure herein relates to a communication device for a radio-frequency (RF) transmission and reception system, a receiver device of the communication device comprising an IQ modulator having an analog-to-digital converter (ADC) for the in-phase (I) component of an RF reception signal and an analog-to-digital converter (ADC) for the quadrature (Q) component of the RF reception signal. The IQ modulator is coupled to a first RF downconverter module configured to downconvert the in-phase (I) component of the RF reception signal from the RF domain to baseband and to a second RF downconverter module configured to downconvert the in quadrature (Q) component of the RF reception signal from the RF domain to baseband. The receiver device further comprises a local oscillator circuit configured to generate a local oscillator (LO) signal and a polarization circuit coupled downstream of the local oscillator circuit. The polarization circuit is configured to output two mutually orthogonal linearly polarized LO signals derived from the LO signal output by the local oscillator circuit and to route a first one of the two mutually orthogonal linearly polarized LO signals to first and second RF mixers of the first RF downconverter module and to route a second one of the two mutually orthogonal linearly polarized LO signals to first and second RF mixers of the second RF downconverter module. The receiver device further comprises a first phase shifting circuit coupled between the polarization circuit and the first and second RF mixers of the first RF downconverter module and a second phase shifting circuit coupled between the polarization circuit and the first and second RF mixers of the second RF downconverter module. The first and second phase shifting circuits are configured to generate right-handed and left-handed circularly polarized LO signals by imposing a 90° phase shift on the respective ones of the two mutually orthogonal linearly polarized LO signals.

According to some embodiments of the third aspect, the first and second phase shifting circuits are implemented within the first and second RF downconverter module, respectively. According to some alternative embodiments of the third aspect, the first and second phase shifting circuits are implemented outside the first and second RF downconverter modules. In particular, in some embodiments, the first and second phase shifting circuits may be connected directly to the polarization circuit.

According to some embodiments of the third aspect, the first and second RF downconverter modules each include a receiving amplifier coupled to the input ports of the first and second RF mixers. According to some embodiments of the third aspect, the receiving amplifier of the first RF downconverter module is coupled to a first receive antenna. According to some embodiments of the third aspect, the receiving amplifier of the second RF downconverter module is coupled to a second receive antenna.

According to some embodiments of the third aspect, the first and second phase shifting circuits are implemented with a T-Flipflop comprising two D-Flipflops having the inverted signal output port connected to the input port.

According to a fourth aspect of the disclosure herein, a radio-frequency (RF) transmission and reception system includes one or more transmitter devices according to the second aspect and one or more receiver devices according to the third aspect.

A fifth aspect of the disclosure herein relates to a flat optical terminal having a plurality of functional layers in a layer stack, with each functional layer implementing a different function in terms of optical compensation and beam processing, the layer stack comprising a first layer including an optical phase array, a second layer stacked on top of the first layer including a liquid crystal modulator or an array of micro-electromechanical elements, and a third layer stacked on top of the second layer including a polarization grating.

One of the ideas of the disclosure herein according to the fifth aspect is to implement binning for antenna elements of an optical phase array (OPA) and to thereby create a relatively flat OPA, reducing air drag and weight of the optical terminal equipped with such an OPA. The optical terminal provides a solution to vary the spatial phase profiles of the optical transmission and reception beams and to influence the directivity of the antenna elements by using a combination of mechanical and non-mechanical beam steering components. The optical terminal may work both as receiver and as transmitter, however, it may be possible for the optical terminal to work as receiver only or as transmitter only. In the latter case, two separate optical terminals would need to be implemented adjacent to each other in order to implement a transmission and reception antenna front-end.

According to some embodiments of the fifth aspect, the layer stack may further comprise a modulation/demodulation layer coupled to the optical phase array in the first layer.

According to some embodiments of the fifth aspect, the optical phase array may include multiple antenna elements binned in one or more two-dimensional antenna blocks, each of which antenna blocks is connected to a common bus and coupled to a block-associated phase tuning element. According to some alternative embodiments of the fifth aspect, the optical phase array may include multiple rows of antenna elements connected in parallel to each other to a common bus, the common bus each being configured to be fed via a single phase tuning element per common bus.

According to some embodiments of the fifth aspect, the multiple antenna elements may be overlaid with flat optical lenses, such as microlenses or Newtonian telescopes made from flat meta-lenses. In some configurations thereof, each antenna element may be overlaid with a single flat optical lens. In some alternative configurations thereof, subsets of antenna elements may be overlaid with a common flat optical lens.

A sixth aspect of the disclosure herein relates to a flat optical terminal having an optical phase array with multiple antenna elements binned in one or more two-dimensional antenna blocks, each of which antenna blocks is connected to a common bus, coupled to a block-associated phase tuning element, and mounted on a mechanical tip-tilt stage for mechanically adjusting the alignment of the multiple antenna elements for steering the beam direction of a transmission and/or reflection beam of the optical phase array.

One of the ideas underlying the sixth aspect of the disclosure herein is to reduce the power consumption required for controlling each individual antenna element of an optical phase array by binning multiple antenna elements to a collectively controlled antenna block, but recovering the lost control in beam steering and phase control by outsourcing the control to mechanical mounting stages for the antenna blocks which have a relatively lower power consumption.

According to some embodiments of the sixth aspect, the multiple antenna elements may be overlaid with flat optical lenses, such as microlenses or Newtonian telescopes made from flat meta-lenses. In some configurations thereof, each antenna element may be overlaid with a single flat optical lens. In some alternative configurations thereof, subsets of antenna elements may be overlaid with a common flat optical lens.

According to some embodiments of the sixth aspect, the mechanical tip-tilt stages may be tiltable in one direction only or in two mutually orthogonal directions in the plane of the antenna block.

According to some embodiments of the sixth aspect, the mechanical tip-tilt stages may be mounted to a common panel. In some configurations thereof, the panel may be rotatable around an axis parallel to the surface normal of the panel.

A seventh aspect of the disclosure herein relates to an adaptive receiver for optical free-space communication, the receiver comprising an adaptive lens, an integrated optics chip package arranged at the focal point of the adaptive lens, the integrated optics chip package including: a multi-mode input waveguide surrounded by a plurality of tilt sensing multi-mode waveguides; a tilt sensing array of tilt detectors, each tilt detector being configured to sense the amplitude of light traversing a respective one of the tilt sensing multi-mode waveguides; and a lens control device receiving the sensed amplitudes of the tilt detectors, the lens control device being configured to control the shape of the adaptive lens based on the sensed amplitudes of the tilt detectors in order to correct for tilt and higher order wavefront errors.

One idea involved in the seventh aspect of the disclosure herein pertains to the use of chipbound arrays for tip-tilt sensing in order to obviate the necessity for slow responding quadrant diodes in an adaptive optics which are complex and expensive to control. Moreover, slowly operating steering mirrors and/or deformable mirrors may be replaced by faster operating adaptive lenses in order to correct for tip-tilt imbalances in coupling light beams to a multi-mode waveguide.

According to some embodiments of the seventh aspect, the tilt detectors may include microlenses glued to the glued to the back interface of the integrated optics chip package.

According to some embodiments of the seventh aspect, the multi-mode input waveguide splits up into a plurality of tapering single-mode or fewer-mode waveguides. In some embodiments thereof, the plurality of tapering single-mode or fewer-mode waveguides may each comprise a phasor configured to correct phase differences between wavefronts traversing the single-mode or fewer-mode waveguides in order to effectively combine the different wavefronts to a single-mode fiber again.

According to some embodiments of the seventh aspect, the single-mode or fewer-mode waveguides are coupled to a wavefront sensing array of detectors, with one detector per single-mode or fewer-mode waveguide. In some embodiments thereof, the detectors are configured measure the power of the light carried through the plurality of single-mode or fewer-mode waveguides. Then, a signal indicating the measured power may be sent to the lens control device for controlling the shape of the adaptive lens so that higher order turbulences may be accounted for.

BRIEF DESCRIPTION OF THE DRAWINGS

The disclosure herein will be explained in greater detail with reference to example embodiments depicted in the drawings as appended.

The accompanying drawings are included to provide a further understanding of the disclosure herein and are incorporated in and constitute a part of this specification. The drawings illustrate the embodiments of the disclosure herein and together with the description serve to explain the principles of the disclosure herein. Other embodiments of the disclosure herein and many of the intended advantages of the disclosure herein will be readily appreciated as they become better understood by reference to the following detailed description. The elements of the drawings are not necessarily to scale relative to each other. Like reference numerals designate corresponding similar parts.

Figure 1:
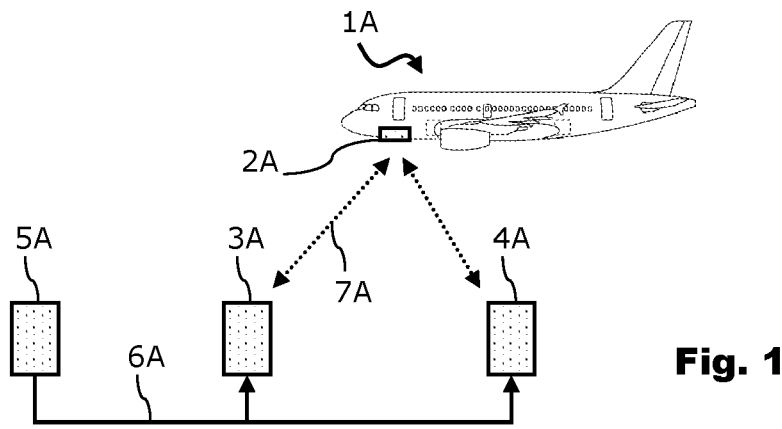
FIG. 1 schematically illustrates an air-to-ground network using free-space optical communication links according to some embodiments of the disclosure herein.

In the figures, like reference numerals denote like or functionally like components, unless indicated otherwise. Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

DETAILED DESCRIPTION

Although specific embodiments have been illustrated and described herein, it will be appreciated by those of ordinary skill in the art that a variety of alternate and/or equivalent implementations may be substituted for the specific embodiments shown and described without departing from the scope of the disclosure herein. Generally, this application is intended to cover any adaptations or variations of the specific embodiments discussed herein.

FIG. 1 shows a schematic illustration of an aircraft 1A that includes a flat optical communication terminal 2A. The optical communication terminal 2A is mounted to an external surface of the aircraft 1A, such as for example a part of the lower surface of the fuselage. The optical communication terminal 2A is designed to substantially not protrude from the plane of the external surface of the aircraft 1A to which it is mounted, thereby reducing any additional air drag that the optical communication terminal would otherwise create.

The optical communication terminal 2A is configured to communicate with one or more ground stations 3A, 4A via a free-space optical communication link 7A. Particularly, more than one free-space optical communication link 7A may be maintained to different ones of the ground stations 3A, 4A, thereby enabling a handover procedure of the aircraft 1A between the different ground stations 3A, 4A. That way, any communication networks on the aircraft 1A may stay connected to the same ground-based communication network 5A to which the ground stations 3A, 4A are connected. In particular, the ground-based communication network 5A may be based on optical fiber networks 6A, i.e. may be wire-bound in contrast to the wireless optical communication links 7A. The optical communication links 7A may facilitate exchanging data between an aircraft network and the ground-based optical fiber network 5A via the established free-space optical communication link 7A.

Figure 2:
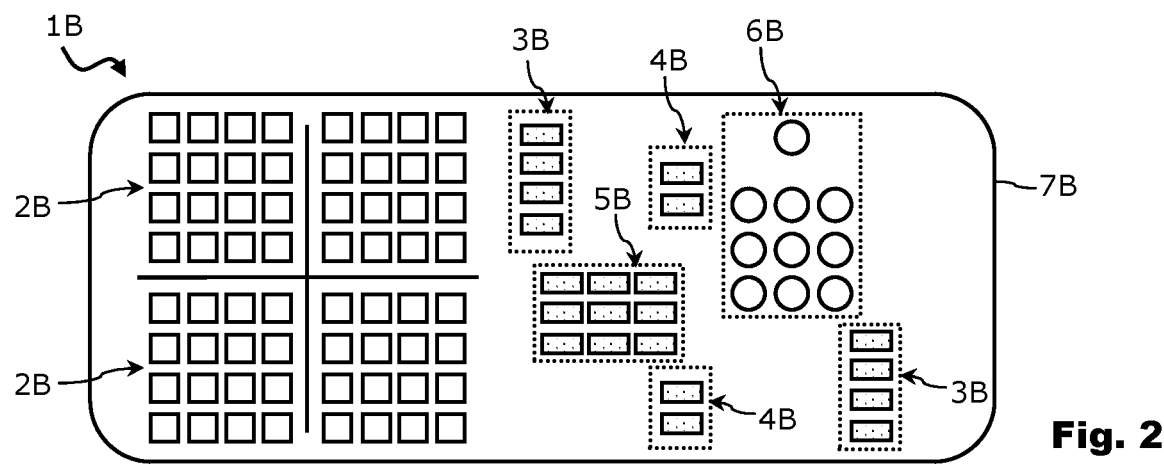
FIG. 2 schematically illustrates an example implementation for a multi-band flat antenna device according to some embodiments of the disclosure herein.
Figure 3:
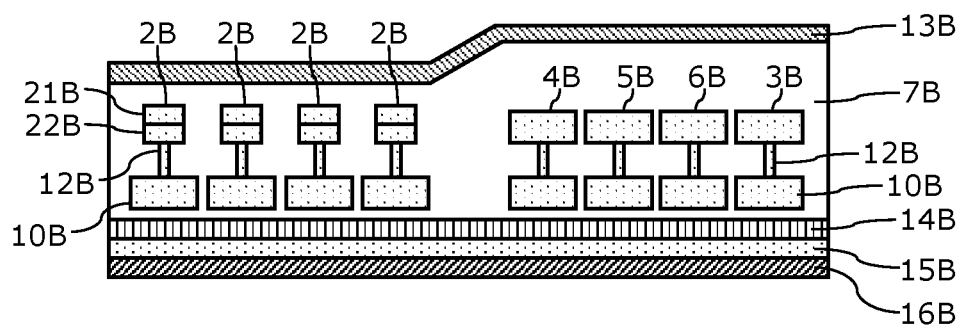
FIG. 3 schematically illustrates the multi-band flat antenna device of FIG. 1 in a sectional view.

FIGS. 2 and 3 show schematic illustrations of a multi-band flat antenna device 1B. FIG. 2 shows a top view of the multi-band flat antenna device 1B, while FIG. 3 depicts a sectional view from the side. The multi-band flat antenna device 1B generally includes a substrate 7B which may for example comprise polyurethane (PU), silicones or a flexible epoxy mold. The substrate 7B may embed any of the electronic components therein by filling up trenches and gaps between components to planarize the overall antenna device 1B. The material of the substrate 7B may be chosen to provide high stretchability without bending, low shrinkage and good adhesion to PCB materials such as FR4 or polyimide (PI).

The substrate 7B may be provided with a wiring layer 14B carrying clock lines, data lines and/or power strip lines. For purposes of isolation, a polyimide film 15B may be placed on top of the wiring layer 14B, for example having a thickness of approximately 50 μm. A layer of adhesive or glue 16B may be provided on the bottom side of the polyimide film 15B to adhere the antenna device 1B to an external surface of an aircraft, such as for example a fuselage. The adhesive layer 16B may for example be implemented as double sided adhesive tapes. The antenna device 1B may in particular be used in equipping an aircraft, such as the aircraft 1A of FIG. 1, with a communication antenna array.

On top of the wiring layer 14B and embedded within the substrate, there may be multiple segmented antenna tiles, each carrying different numbers and types of antenna components 2B, 3B, 4B, 5B, 6B. The segmentation of the antenna tiles aids in flexibly conforming the substrate 7B to a curved or non-planar surface, such as an aluminum or composite surface of a fuselage of an aircraft. Solder paste and solder masks may be printed on the antenna tiles in order to provide electrical interconnections between the antenna tiles and the underlying wiring layer 14B. Alternatively to solder paste and solder masks, solder balls may be provided for.

A protection layer 13B may be formed over the substrate 14B so that the antenna tiles are protected from mechanical and environmental stress, such as rain, icing, hail, UV irradiation and similar environmental impact. Furthermore, the protection layer 13B may provide stability against electrostatic discharges (ESD).

The antenna tiles may include multiple antennae of various types: Ku-band and Ka-band antennae 2B, for example arranged in rectangularly shaped antenna element patches with planar dipole antennae 21B for Ka-band satellite communication stacked on top of or below slot antennae 22B for Ku-band satellite communication, VHF (very high frequencies), ELT-1, ELT-2 and ELT-3 antennae 3B according to the IFA model (inverted F antennae), EAN (European Aviation Network) MSS (Mobile Satellite Service) and EAN CGC (Complementary Ground Component) antennae 4B in patch element arrays, patch arrays 5B for Inmarsat and Iridium cockpit communications and GNSS (Global Navigation Satellite System), circular short-circuited patch arrays 6B for LDACS (L-band Digital Aeronautical Communications System) and scaled versions for WACS (White Alice Communications System) and FOMAX (Flight Operations and Maintenance Exchanger) as well as 800 MHz to 2.7 GHz anywave antennae (not explicitly shown). In general, there may be any type of communication device used to cover communication frequency ranges from 100 MHz up to 6 GHz and from 10 GHz up to 60 GHz.

The Ka-band and Ku-band antennae may have a thickness of about 10 mm, the VHF, ELT-1, ELT-2 antennae 3B may have a thickness of about 62 mm, the ELT-3 antennae may have a thickness of about 24 mm, the LDACS, WACS and FOMAX circular patches may have a thickness of about 18 mm, the EAN MSS and EAN CGC antennae 4B may have a thickness of about 8 mm, the patch arrays 5B for Inmarsat and Iridium cockpit communications and GNSS may have a thickness of about 15 mm, and the anywave antennae may have a thickness of about 70 mm.

Each of the antennae 2B, 3B, 4B, 5B and 6B may be connected to respective communication chipsets 10B by electrically conductive interconnection elements 12B. The chipsets 10B may be suitably connect to the data lines, clock lines and power strip lines of the wiring layer 14B by electrical interconnections (not explicitly shown in FIG. 3).

The multi-band flat antenna device 1B of FIGS. 2 and 3 has a conformal design, can be glued on the fuselage surface of an aircraft and provides sufficient mechanical and thermal resistance to environmental stress. The front-end is already included in the antenna device 1B and includes a digital baseband interface for seamlessly integrating into an existing SDR architecture.

Figure 4:
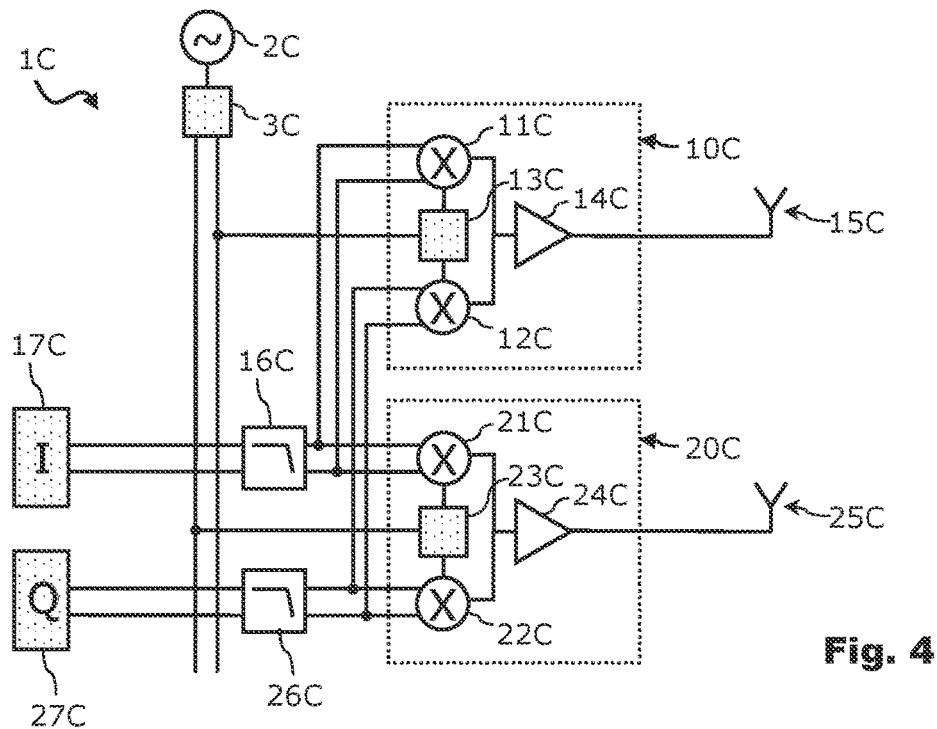
FIG. 4 illustrates a block diagram of a transmitter device for a radio-frequency (RF) transmission and reception system according to some embodiments of the disclosure herein.

FIG. 4 illustrates a block diagram of a radio-frequency (RF) transmission and reception system 1C in transmit configuration. The receive configuration is not explicitly shown, but works according to similar principles. The RF transmission and reception system 1C is using two communication pathways at the same frequency and during the same time slots, separated from each other by way orthogonal polarization. For example, linear polarization employs horizontally and vertically polarized modes, while circular polarization employs left-handed and right-handed polarization modes. Circular polarization can be achieved by implementing one vertical and one horizontal antenna arrangement and by ensuring a phase difference of ±90° for the carrier frequency between the two antenna arrangements. Depending on the sign of the phase difference, the transmitted or received signals are then left-handedly or right-handedly circularly polarized.

The RF transmission and reception system 1C involves a system architecture for single antennae and antenna arrays using a polarization processing at the level of the local oscillator source. In practical configurations like the implementations shown in FIGS. 2 and 3, RF transmission and reception systems employ circular polarization techniques since they enable transmission and reception of signals independently of the mechanical rotational state of the transmit and receive antenna arrangements. As mentioned before, for implementing left-handed and right-handed polarization modes in an RF transmission and reception system 1C there needs to be both phase shifting circuitry for imposing a ±90° phase shift on the carrier frequency of the RF transmission and reception system 1C and linear polarization circuitry for filtering the transmission and/or reception signals according to mutually orthogonal linear polarizations.

The system 1C includes an IQ modulator in the baseband domain having a digital-to-analog converter (DAC) 17C for the in-phase (I) component of the RF signal and a digital-to-analog converter (DAC) 27C for the quadrature (Q) component of the RF signal. The output of the DAC 17C is coupled to a low-pass filter 16C that is in turn coupled to both a first RF upconverter module 10C and a second RF upconverter module 20C. Similarly, the output of the DAC 27C is coupled to a low-pass filter 26C that is in turn coupled to both the first RF upconverter module 10C and the second RF upconverter module 20C. The RF upconverter modules 10C and 20C are configured to upconvert the incoming signals from the low-pass filters 16C, 26C from baseband to the RF domain. To that end, the RF upconverter modules 10C and 20C each include two RF mixers 11C, 12C and 21C, 22C, respectively, which are configured to mix the I/Q components of the incoming signals with a local oscillator signal from a local oscillator circuit 2C.

A respective first one of the two RF mixers 11C and 21C is used for a left-handed circularly polarized transmit signal and a respective second one of the two RF mixers 12C and 22C is used for a right-handed circularly polarized transmit signal (or vice versa). The differently polarized transmit signals are output from the RF mixers 11C, 12C and 21C, 22C to a common amplifier 14C, 24C of the first and second RF upconverter modules 10C and 20C, respectively, which in turn amplify the upconverted transmit signals for transmission using a first antenna 15C and a second antenna 25C.

In both configurations, a local oscillator circuit 2C is configured to provide a local oscillator (LO) signal for the RF mixers 11C, 12C and 21C, 22C. A polarization circuit 3C is coupled downstream of the local oscillator circuit 2C and is configured to output two mutually orthogonal linearly polarized LO signals derived from the LO signal output by the local oscillator circuit 2C. The polarization circuit 3C may for example be a passive circuit, i.e. a circuit with passive circuitry components. The polarization circuit 3C may for example include delay lines, a branchline coupler, a 90° hybrid coupler, a polyphase filter or similarly functional passive elements. Without limitation of generality, the polarization circuit 3C may output a horizontally polarized LO signal and a vertically polarized LO signal. The horizontally polarized LO signal may be input to the first RF upconverter module 10C. The vertically polarized LO signal may be input to the second RF upconverter module 20C.

By employing the polarization circuit 3C, the amount of circuitry elements may be advantageously reduced, especially when used for large antenna arrays. This results in smaller area and power consumption and exhibits huge potential for error correction and calibration of the antenna array by putting some effort in making the polarization circuit 3C adjustable since it is only placed once in the design. Processing of the polarization can be done on the less sensitive local oscillator signals and in baseband domain, as opposed to polarization processing in the RF domain.

Figure 5:
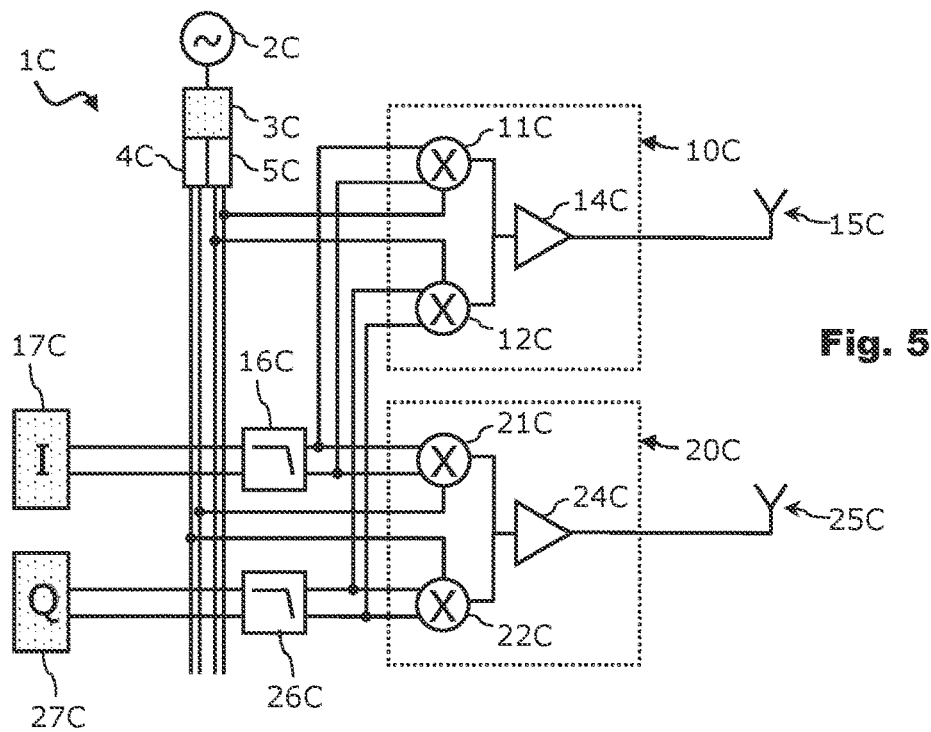
FIG. 5 illustrates a block diagram of a transmitter device for a radio-frequency (RF) transmission and reception system according to some further embodiments of the disclosure herein.

Downstream of the polarization circuit 3C, phase shifting circuits for the differently polarized LO signals are implemented. Typically, a fixed phase shift of 90° needs to be implemented due to the IQ-operation principle. In the configuration of FIG. 4, a first phase shifting circuit 13C for the horizontally polarized LO signals is implemented within the first RF upconverter module 10C. Similarly, a second phase shifting circuit 23C for the vertically polarized LO signals is implemented within the second RF upconverter module 20C. In the configuration of FIG. 5, a first phase shifting circuit 5C for the horizontally polarized LO signals is implemented directly after the first output port of the polarization circuit 3C, and a second phase shifting circuit 5C for the vertically polarized LO signals is implemented directly after the second output port of the polarization circuit 3C. The configuration of FIG. 5 fits more to larger arrays of antenna elements due to the increased efficiency of only two phase shifting circuits 5C and 4C being needed for a larger number of mixers, while the configuration of FIG. 4 offers higher flexibility in correcting for errors and calibrating of the differently polarized LO signals in each upconverter module separately.

Figure 6:
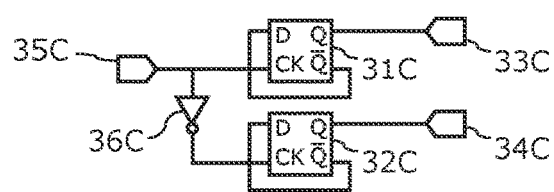
FIG. 6 schematically illustrates a possible logic implementation for a phase shifter circuit to be used in the RF transmission and reception system of FIGS. 4 and 5.

A possible implementation of the phase shifting circuits 4C, 5C, 13C and 23C making use of digital phase splitters with D-Flipflops is schematically depicted in FIG. 6. Basically, the diagram shows a T-Flipflop including two D-Flipflops, each of them having the inverted output terminal Q_bar connected to the input terminal D. A double frequency input port 35C is split into a main signal branch and an inverse signal branch by a logic NOT-gate 36C. The main signal branch is fed into the clock input CK of a first D-Flipflop 31C, while the inverse signal branch is fed into the clock input CK of a second D-Flipflop 32C. For both D-Flipflops 31C and 32C, the inverted output terminal Q_bar is fed back into the input terminal D so that the outputs Q at the output ports 33C and 34C are single frequency with respect to the double frequency input port 35C and due to the inversion of the logic NOT-gate 36C 90° phase shifted with respect to each other.

Advantages of such D-Flipflops are the compact design, the high bandwidth, the precise phase alignment and the flexibility in phase reversion. This is bought with the requirement of provision of a local oscillator signal with double the frequency than conventionally needed, imposing certain constraints on the local oscillator circuit 2C. Of course, other types of phase shifting circuits are equally possible, such as Lange couplers, polyphase filter quadrature splitters, 3 db quadrature hybrid couplers, Schiffman phase shifters or branchline couplers.

FIGS. 7, 8, 9 and 10 depict example configurations of flat optical terminals 1D based on integrated photonics optical phase array (OPA) technology for air-to-ground, air-to-air and air-to-satellite communications. Integrated photonics OPAs typically include a number of individually tuned antenna elements 4D for transmission and reception. In all of the example configurations, the antenna elements 4D are mounted on a panel 2D that can be rotated around an axis parallel to the surface normal of the panel 2D (indicated by the reference numeral RD). The panel 2D may for example be embodied as a rotatable disc (as in FIGS. 7, 8 and 10) or as two rotating discs concentrically mounted on top of each other (as in FIG. 9).

Figure 7:
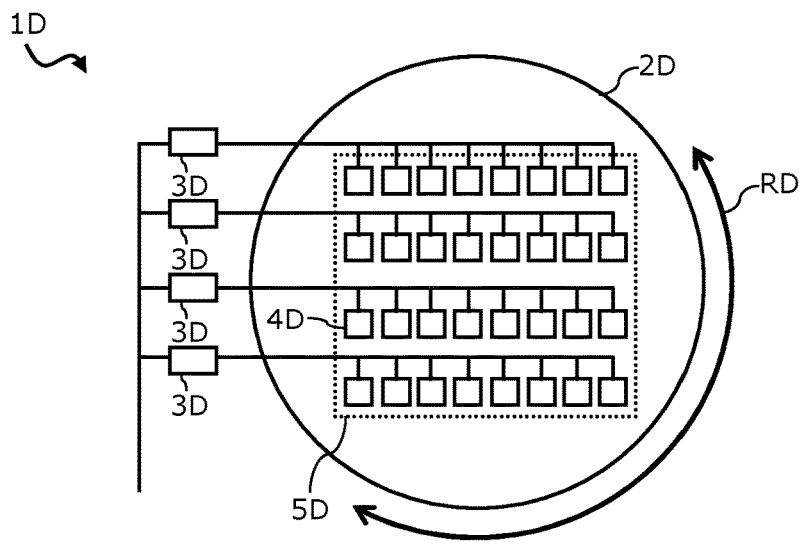
FIG. 7 schematically illustrates a first configuration of a flat optical terminal based in integrated photonics OPAs.

FIG. 7 schematically illustrates a first variant of a flat optical terminal 1D based in integrated photonics OPAs. In this configuration, multiple rows of antenna elements 4D are each connected parallel to each other to a common bus which in turn are fed via a single phase tuning element 3D per common bus. A plurality of rows can be co-located on an antenna tile 5D mounted to the panel 2D. With the configuration of FIG. 7, individual transmitters may be binned in a line so that each line only needs to be steered in one dimension. The other dimension may be accounted for by rotating the panel 2D as a whole. This is particularly useful as the number of phasors in this case equals to the squareroot of the overall number of transmitters.

Phase tuning via the phase tuning elements 3D may specifically be implemented for beam transmission—a small delay compensating the phase difference compared to 27 is introduced by way of thermal or electro-optical control of a delay element.

The single phase tuning elements 3D are configured to steer a transmission beam across the zenith angle per row of antenna elements 4D, while the rotation of the underlying panel 2D provides for the beam steering across the azimuth angle. The rotatability of the panel 2D provides the additional degree of freedom RD which is lost by mechanically linking the antenna elements 4D together in rows. This basic structure may be tiled in a two-dimensional lattice in order to reduce the row length and therefore the bus length per interconnected row in comparison to the overall extension of the optical terminal 1D. The sizing of the rows and tiles in such a lattice may be determined based on estimated losses of the waveguides used for the common buses, depending on the application requirements regarding reliability, package losses and desired bandwidth. In FIG. 7, only a single antenna tile 5D is shown exemplarily for purposes of clarity and explanation, however, more than one tile may equally be implemented on the panel 2D.

Figure 8:
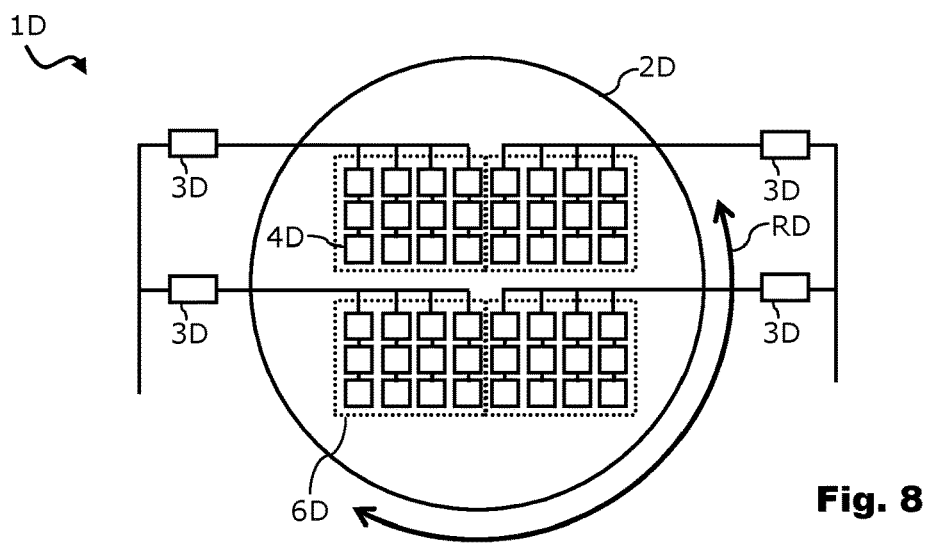
FIG. 8 schematically illustrates a second configuration of a flat optical terminal based in integrated photonics OPAs.

FIG. 8 schematically illustrates a second variant of a flat optical terminal 1D based in integrated photonics OPAs. In this configuration, multiple antenna elements 4D are binned in two-dimensional antenna blocks 6D, each of which is connected to a common bus and coupled to a block-associated phase tuning element 3D. Each of the antenna blocks 6D is small enough to retain a sufficient spatial phase resolution, but large enough to reduce power consumption for beam steering purposes down to an acceptable level. The two-dimensional antenna blocks 6D are tiled together on a two-dimensional lattice. Each of the two-dimensional antenna blocks 6D may be mounted on a mechanical tip-tilt stage, so that the antenna elements 4D of each two-dimensional antenna block 6D may be mechanically adjusted for steering the beam direction. Steering the beam polarization may in this case be achieved by rotating the panel 2D on which the mechanical tip-tilt stages for the antenna blocks 6D are mounted. The mechanical tip-tilt stages may be tiltable in one direction only or in two mutually orthogonal directions in the plane of the antenna block 6D.

In some variations, it may be possible to overlay each of the two-dimensional antenna blocks 6D with flat optical lenses. The flat optical lenses improve the collection efficiency of the antenna elements 4D of each of the antenna blocks 6D so that the number of phase tuning elements 3D may be reduced further. The flat lenses may either be overlaid over the antenna elements 4D individually, over a subset of antenna elements 4D within a given antenna block 6D or over the antenna block 6D as a whole.

Figures 9, 10:
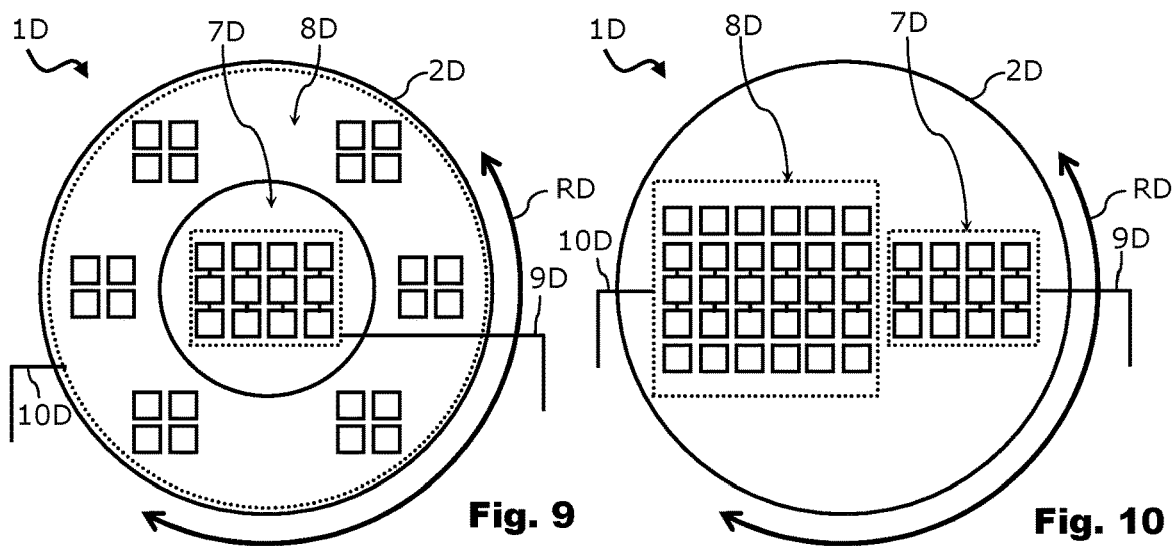
FIG. 9 schematically illustrates a third configuration of a flat optical terminal based in integrated photonics OPAs.
FIG. 10 schematically illustrates a fourth configuration of a flat optical terminal based in integrated photonics OPAs.

FIG. 9 schematically illustrates a third variant of a flat optical terminal 1D based in integrated photonics OPAs. The optical terminal 1D includes a receiver section 8D as an outer ring of antenna elements 4D concentrically arranged around a transmitter section 7D in the middle of the panel 2D. The antenna elements 4D of the terminal 1D depicted in FIG. 9 may be arranged according to any of the configurations as exemplarily shown and explained in conjunction with FIGS. 7 and 8. For the receiver section 8D, one or more phase tuning elements 10D may be coupled to the antenna elements 4D (or tiles and/or blocks of antenna elements 4D) via one or more common buses. Similarly, for the transmitter section 7D, one or more phase tuning elements 9D may be coupled to the antenna elements 4D (or tiles and/or blocks of antenna elements 4D) via one or more common buses.

The variant of FIG. 10 is similar to the variant of FIG. 9, however, instead of concentrically arranged and nested transmitter and receiver sections, the transmitter section 7D and the receiver section 8D are mounted on the panel 2D adjacent to each other in a side-by-side type of geometry.

In both of the terminals 1D of FIGS. 9 and 10, each of the transmitter section 7D and the receiver section 8D may be mechanically moved independently from each other. For example, in the nested ring geometry of FIG. 9, both rings may be rotated independently from each other. The receiver section 8D may for example include several steerable panels for each of the binned tiles of antenna elements 4D. Each of the steerable panels may be steerable in azimuth angle and zenith angle so that an angle of incidence of 0° with respect to any incoming beam may be achieved. On top of each of the panels, grating couplers may be installed for most efficient collection of light. The antenna elements 4D may be completely passive elements so that electronic or optical beamsteering would not be necessary. Alternatively, some or all of the antenna elements 4D may be active nanoantennae or stacks of liquid crystal gratings coupled to a liquid crystal modulator. For example, the receiver section 8D may be implemented with passive antenna elements 4D while the transmitter section 7D may be implemented with active antenna elements 4D in order to control the transmission angle of the outgoing beams of light.

Figure 11:
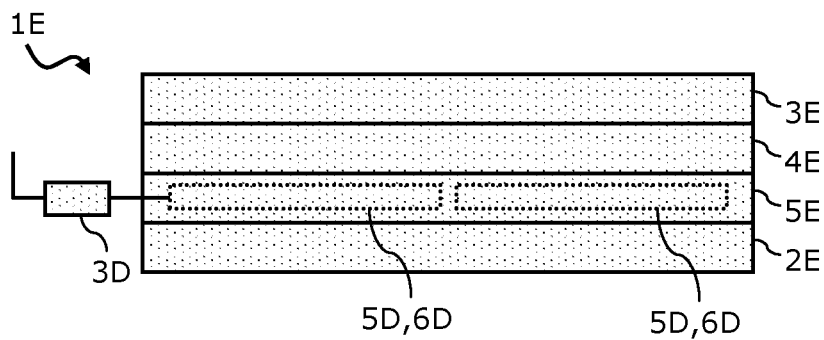
FIG. 11 schematically illustrates a sectional view of a layer configuration for a flat optical terminal based in integrated photonics OPA.

As the propagation direction of a light beam is encoded in its spatial phase, receiving this light beam at a specific angle requires either moving the plane of the receiver towards this angle or compensating for the spectral phase by optical device(s). Locally tunable phase masks could in principle be employed for an optical terminal in order to compensate any phase slopes and phase distortions due to the different angles of arrival of the incoming light beams. FIG. 11 schematically illustrates a flat optical terminal 1E having a plurality of functional layers in a layer stack, with each functional layer implementing a different function in terms of optical compensation and beam processing. The terminal 1E illustrated in FIG. 11 may employ binned or tiled structures and patterns of antenna elements 4D as explained in conjunction with FIGS. 7 to 10.

The functions of the functional layers in the stack may for example include course beam steering, fine beam steering, wavefront correction, waveguide coupling, modulation and demodulation, as well as interfacing with underlying electronics. A possible example configuration for such a layer stack is depicted in FIG. 11. The terminal 1E in FIG. 11 is exemplarily used for steerable optical beam transmission having a pre-compensation of the transmitted wavefronts. For optical beam reception with control of incoming beam directions and compensation of wavefronts, an analogous layout may be used with the order of functions in the stack reversed.

Layer 5E is used as an extended light source, for example based on an OPA such as the binned antenna tiles 5D or antenna blocks 6D as illustrated and explained in conjunction with FIGS. 7 and 8. The binning provides for optimal phase control, while sacrificing control over finer beam steering. Such a tradeoff is acceptable since the fine beam steering is accomplished by a layer higher in the sequence of the stack. Phase tuning elements 3D such as thermal, electro-optical or piezoelectric phase tuning elements may be employed, depending on the desired operating voltage and power consumption requirements.

Similar to the configuration of FIGS. 7 and 8, it may be possible to overlay each of the two-dimensional antenna blocks 6D or antenna tiles 5D with flat optical lenses, such as microlenses or Newtonian telescopes made from flat meta-lenses. The flat optical lenses improve the collection efficiency of the antenna elements of each of the antenna blocks 6D or antenna tiles 5D so that the number of required phase tuning elements 3D may be reduced. The flat lenses may either be overlaid over the antenna elements individually, over a subset of antenna elements within a given antenna block or tile as a whole.

On top of layer 5E, layer 4E uses a liquid crystal modulator or an array of micro-electromechanical elements (MEMS) to achieve fine beam steering. MEMS are fasted to operate, however, they are more challenging to operate in an optically transmissive setup.

On top of the fine beam steering layer 4E, a layer 3E is implemented with a polarization grating for coarse beam steering. Below the extended light source layer 5E, a layer 2E for modulation/demodulation and possibly coupling to external electronics may be provided.

The optical terminal 1E may have both receiver and transmitter device implemented on the same terminal, but it may also be possible to form two separate terminals for the transmission architecture and the receiver architecture of an optical communication transmission and reception system.

Figure 12:
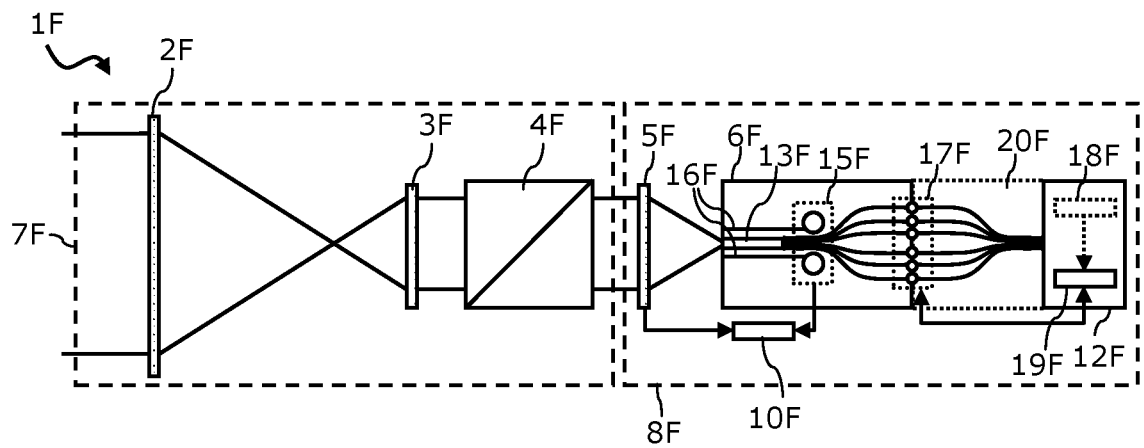
FIG. 12 schematically illustrates an example configuration of an adaptive receiver for optical free-space communication in side view.
Figure 13:
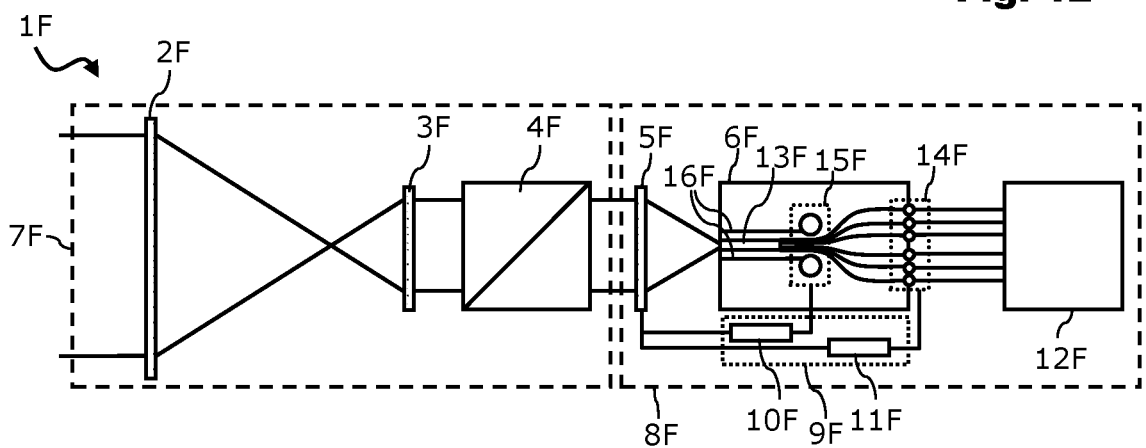
FIG. 13 schematically illustrates another example configuration of an adaptive receiver for optical free-space communication in side view.

FIGS. 12 and 13 each show an example configuration of an adaptive receiver 1F for optical free-space communication in sectional side view. The reception end for an incoming beam of light is generally to the left in the illustration of the FIGS. 12 and 13, with the beam of light generally travelling through the receiver 1F from left to right in the illustration.

One of the main challenges in optical free-space communication is to reliably and efficiently couple light having travelled through a generally dynamic transmission medium into a single-mode fiber or waveguide for further processing. Previous solutions involve adaptive optics with a Shack-Hartmann sensor, quadrant diodes and controllable mirrors. Such adaptive optics is configured to sense distortions of an incoming wavefront and to compensate the sensed distortions by controlling a downstream device, for example a liquid crystal array or a deformable mirror. However, such solutions are bulky and are expensive to implement. Thus, the solution of this disclosure aims at integrating the functionality of the adaptive optics into an integrated optics chip package.

The receiver 1F includes entrance optics generally denoted as 7F and a wavefront combiner generally denoted as 8F coupled downstream to the entrance optics 7F. The entrance optics system 7F includes a focusing lens system comprising lenses 2F and 3F projecting incoming light to a downstream beamsplitter 4F for separating received light and light to be transmitted. The received light is directed from the beamsplitter to an adaptive lens 5F, i.e. a lens that is dynamically adjustable in its shape using external physical controlling parameters. Such controlling parameters may for example be control voltage, temperature, magnetic or electric field, electrowetting, dielectric permittivity or mechanical pressure. The dynamic adjustment of the shape of an adaptive lens 5F may for example be performed by one or more actuators, such as piezoelectric actuators, conductive membranes, phase-change materials, hydrogels or patterned electrodes.

The adaptive lens 5F and consequently its shape may be controlled by one or more lens control devices 10F, 11F. The one or more lens control devices 10F, 11F may generally be included in a lens control system 9F. At the focal point of the adaptive lens 5F, an integrated optics chip package 6F is arranged. The chip package 6F may have a central multi-mode input waveguide 13F that is surrounded by a plurality of tilt sensing multi-mode waveguides 16F.

Figure 14:
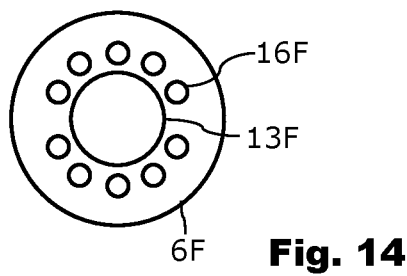
FIG. 14 schematically illustrates a front view on the input interface of the adaptive receivers of FIGS. 12 and 13.

While the input interface of the chip package 6F is generally rectangular, a detail of the front view of the input interface of the chip package 6F is schematically shown in FIG. 14: The entrance to the central multi-mode input waveguide 13F can be symmetrically surrounded by the entrances to the tilt sensing multi-mode waveguides 16F. For example, there may be six or eight tilt sensing multi-mode waveguides 16F included in the chip package 6F. However, other numbers for the plurality of tilt sensing multi-mode waveguides 16F may equally be possible. The plurality of tilt sensing multi-mode waveguides 16F lead to a tilt sensing array 15F of tilt detectors. If the incoming light beam is tipped or tilted with respect to the input interface plane of the central multi-mode input waveguide 13F, a portion of the incoming light will be coupled into the tilt sensing multi-mode waveguides 16F. By sensing the amplitudes and amplitude distribution of the light arriving at the tilt sensing array 15F, for example by microlenses glued to the back interface of the chip package 6F acting as tip/tilt sensors, a first lens control device 10F may be used to control the adaptive lens in order to minimize the amplitude of light arriving at the tilt sensing array 15F, i.e. to steer the incoming beam of light without any tipping or tilting to the central multi-mode input waveguide 13F for optimum coupling.

Correcting for tipping and tilting may still leave the point spread function (PSF) enlarged due to turbulences in the transmission medium. Therefore, the central multi-mode input waveguide 13F is spread up into a plurality of single-mode or fewer-mode waveguides. At the interface of the multi-mode input waveguide 13F to the plurality of single-mode or fewer-mode waveguides, the optical losses are negligible, if the transition region changes fairly smoothly from the multi-mode to the fewer-mode waveguides. Light passing through the waveguides will follow the transition if it is gradual enough; that is, if the transformation between the different waveguides occurs over a distance that is long enough. Either end of the waveguides may act as input and output, i.e. the waveguide system is reciprocal.

Ideally, all of the incoming light to the central multi-mode input waveguide 13F would stay in the central single-mode or fewer-mode waveguide coupled coaxially to the central multi-mode input waveguide 13F. However, this will only occur, if the incoming wavefront is entirely flat, i.e. if the incoming light is entirely in the fundamental mode. In practice, higher modes than the fundamental mode will also be present in the incoming wavefront so that some portion of the light will also be coupled into single-mode or fewer-mode waveguides not aligned coaxially with the central multi-mode input waveguide 13F.

As shown in the configuration of FIG. 13 all of the single-mode or fewer-mode waveguides will couple to a wavefront sensing array of wavefront detectors 14F—one wavefront detector per single-mode or fewer-mode waveguide—that measure the power of the light carried through individual ones of the plurality of single-mode or fewer-mode waveguides. Those measurements yield information about the modal structure of the incoming wavefront.

In order to correct for the wavefront, the wavefront sensing array of detectors 14F may be coupled to a second lens control device 11F that may be used to control the adaptive lens in order to flatten the wavefront of the light arriving at the central multi-mode waveguide 13F, i.e. to steer the incoming beam of light without any tipping or tilting to the central multi-mode input waveguide 13F for optimum coupling. Such a configuration is illustrated in conjunction with FIG. 13.

Alternatively, it may be possible to equip the wavefront sensing array with phasors 17F that measure the relative phase of the wavefront travelling through the respective one of the single-mode or fewer-mode waveguides, as illustrated in conjunction with FIG. 12. The phasors 17F may either be active control devices that are able to correct the phases by themselves or they may be passive devices that may be controlled by a phasor control device 19F integrated in a downstream communication signal detector 12F. In the latter case, the phasors 17F as passive devices will not be able to sense the individual phases, but the sensing will be performed by a detector-bound central phase sensing system 18F within the signal detector 12F that delivers the sensing results to the phasor control device 19F for controlling the phasors 17F which may be implemented as liquid crystal phase modulators or other electro-optical components. As wavefront changes occur in a frequency range of up to 1 kHz, electro-optical components having a switching frequency of several GHz will be able to adjust the phases of the higher modes of the wavefront much faster than the coherence time of the atmospheric wavefront changes. This enables a sensorless adaptive optics component with much higher speed than conventional adaptive optics based on deformable or adjustable mirror techniques. Therefore, constructive interference between the re-combined single-mode or fewer-mode waveguides may be established very rapidly without loss of communication link due to transient atmospheric wavefront modulation.

The communication signal detector 12F may be formed on the same chip as the integrated optics. To that end, the chip package 6F may be integrated together with the signal detector 12F on a common system on a chip 20F. Alternatively, it may be possible to provide the signal detector 12F on or as a separate chip.

Similarly, the split up single-mode or fewer-mode waveguides may be led individually and separately to the signal detector 12F for reception of communication signals (cf. FIG. 13). Alternatively, it may be possible for the single-mode or fewer-mode waveguides to re-combine again to a single waveguide exiting to the signal detector 12F (cf. FIG. 12). The re-combination portion may be implemented on a different type of substrate as the chip package 6F. For example, the re-combination portion may be implemented as silicon-nitride based waveguides, whereas the chip package 6F may employ 3D laser written waveguides in silica.

A major problem in free space optical communication on the receive side is the scintillation of power in the fibers as detectors usually cannot handle the experienced dynamic ranges of 60 dB. If maximum intensity is required, the phasors 17F may be adjusted so that light from all fibers may be gathered coherently into one single-mode fiber. Apart from static losses in the optical system, all light impinging on the aperture will be coupled into the final single-mode fiber leading to the communication signal detector 12F.

However, light impinging on the entrance aperture may greatly vary due to atmospheric effects leading to fades and bursts of power which in general is difficult to handle for the receiver 1F. Thus, the phasors 17F may be used to adjust an adaptive coupling efficiency. Since the atmospheric effects are comparably slow to the speed of the communication signal detector 12F and the phasors 17F, the phasors 17F the measured power may be fed back to the phasors 17F to adjust their coupling efficiency accordingly. As an example, if the power of the impinging light is comparably low, the phasors 17F may be set for high coupling efficiency; on the other hand, if the power of the impinging light is comparably high, the phasors 17F may be adjusted to lower the coupled power.

In the foregoing detailed description, various features are grouped together in one or more examples or examples with the purpose of streamlining the disclosure. It is to be understood that the above description is intended to be illustrative, and not restrictive. It is intended to cover all alternatives, modifications, and equivalents. Many other examples will be apparent to one skilled in the art upon reviewing the above specification.

The embodiments were chosen and described in order to best explain the principles of the disclosure herein and its practical applications, to thereby enable others skilled in the art to best utilize the disclosure herein and various embodiments with various modifications as are suited to the particular use contemplated. In the appended claims and throughout the specification, the terms "including" and "in which" are used as the plain-English equivalents of the respective terms "comprising" and "wherein," respectively. Furthermore, "a" or "one" does not exclude a plurality in the present case.

The subject matter disclosed herein can be implemented in or with software in combination with hardware and/or firmware. For example, the subject matter described herein can be implemented in or with software executed by a processor or processing unit. In an example implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A flat optical terminal comprising:
 a plurality of functional layers in a layer stack, with each functional layer implementing a different function of optical compensation and beam processing, the layer stack comprising:
 a first layer including an optical phase array;
 a second layer stacked on top of the first layer including a liquid crystal modulator or an array of micro-electromechanical elements; and
 a third layer stacked on top of the second layer including a polarization grating.

2. The flat optical terminal of claim 1, wherein the layer stack further comprises a modulation/demodulation layer coupled to the optical phase array in the first layer.

3. The flat optical terminal of claim 1, wherein the optical phase array includes multiple antenna elements binned in one or more two-dimensional antenna blocks.

4. The flat optical terminal of claim 3, wherein each of the antenna blocks is connected to a common bus and coupled to a block-associated phase tuning element.

5. The flat optical terminal of claim 1, wherein the optical phase array includes multiple rows of antenna elements connected in parallel to each other to a common bus.

6. The flat optical terminal of claim 5, wherein each common bus is configured to be fed via a single phase tuning element per common bus.

7. The flat optical terminal of claim 1, wherein the multiple antenna elements are overlaid with flat optical lenses.

8. The flat optical terminal of claim 7, wherein the flat optical lenses are microlenses or Newtonian telescopes made from flat meta-lenses.

9. The flat optical terminal of claim 7, wherein each antenna element is overlaid with a single flat optical lens.

10. The flat optical terminal of claim 7, wherein subsets of multiple antenna elements are overlaid with a common flat optical lens.

* * * * *